(12) United States Patent
Kogan et al.

(10) Patent No.: US 7,773,590 B2
(45) Date of Patent: Aug. 10, 2010

(54) COMBINED INTERFACE AND NON-INTERFACE SPECIFIC ASSOCIATIVE MEMORY LOOKUP OPERATIONS FOR PROCESSING OF PACKETS

(75) Inventors: Kirill Kogan, Natanya (IL); Yixing Ruan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1117 days.

(21) Appl. No.: 11/114,349

(22) Filed: Apr. 26, 2005

(65) Prior Publication Data

US 2006/0239258 A1    Oct. 26, 2006

(51) Int. Cl.
*H04L 12/50* (2006.01)
*H04L 12/28* (2006.01)
*G06F 13/00* (2006.01)

(52) U.S. Cl. .................. 370/379; 370/382; 370/383; 370/395.7; 711/108

(58) Field of Classification Search .............. 711/108; 370/379, 382, 383, 395.7
See application file for complete search history.

(56) References Cited

U.S. PATENT DOCUMENTS

| | | | |
|---|---|---|---|
| 6,147,976 A | 11/2000 | Shand et al. | |
| 6,377,577 B1 | 4/2002 | Bechtolsheim et al. | |
| 6,535,951 B1 | 3/2003 | Ross | |
| 6,633,953 B2 * | 10/2003 | Stark ........................... | 711/108 |
| 6,643,260 B1 | 11/2003 | Kloth et al. | |
| 6,658,002 B1 | 12/2003 | Ross et al. | |
| 6,715,029 B1 | 3/2004 | Trainin et al. | |
| 6,792,502 B1 | 9/2004 | Pandya et al. | |
| 6,870,812 B1 | 3/2005 | Kloth et al. | |
| 6,871,262 B1 | 3/2005 | Oren et al. | |
| 6,871,265 B1 | 3/2005 | Oren et al. | |
| 6,961,808 B1 | 11/2005 | Oren et al. | |
| 6,988,106 B2 | 1/2006 | Enderwick et al. | |
| 7,002,965 B1 * | 2/2006 | Cheriton ................. | 370/395.32 |
| 7,065,083 B1 | 6/2006 | Oren et al. | |
| 7,082,492 B2 | 7/2006 | Pullela et al. | |
| 7,114,026 B1 * | 9/2006 | Khanna ...................... | 711/108 |
| 7,177,978 B2 | 2/2007 | Kanekar et al. | |
| 7,240,149 B1 | 7/2007 | Nagaraj et al. | |
| 7,249,216 B2 * | 7/2007 | Uzawa et al. ............... | 711/108 |
| 7,327,727 B2 * | 2/2008 | Rich et al. .................. | 370/389 |
| 7,412,507 B2 * | 8/2008 | Saxena et al. ............... | 709/224 |
| 7,468,975 B1 * | 12/2008 | Davis ......................... | 370/389 |

(Continued)

OTHER PUBLICATIONS

U.S. Appl. No. 10/159,055, filed May 31, 2002, Venkateshwar Rao Pullela.

(Continued)

*Primary Examiner*—Huy D Vu
*Assistant Examiner*—Brandon Renner
(74) *Attorney, Agent, or Firm*—The Law Office of Kirk D. Williams (57) ABSTRACT

Mechanisms for programming and performing combined interface and non-interface specific associative memory lookup operations for processing of packets are disclosed. One system includes multiple interfaces, a content-addressable memory, multiple memory entries and a lookup mechanism. The content-addressable memory includes multiple interface independent entries, multiple first interface dependent entries corresponding to the first interface, and multiple second interface dependent entries corresponding to the second interface. The lookup mechanism is configured to initiate lookup operations in order to produce the interface independent and interface dependent results.

16 Claims, 4 Drawing Sheets

U.S. PATENT DOCUMENTS

| | | | |
|---|---|---|---|
| 7,493,328 | B2 | 2/2009 | Enderwick et al. |
| 7,505,295 | B1* | 3/2009 | Nataraj et al. ............... 365/49.1 |
| 2002/0126672 | A1 | 9/2002 | Chow et al. |
| 2003/0225965 | A1* | 12/2003 | Krishnan .................... 711/108 |
| 2004/0148391 | A1* | 7/2004 | Lake et al. .................. 709/224 |
| 2004/0230740 | A1* | 11/2004 | Chow et al. ................. 711/108 |
| 2005/0063407 | A1* | 3/2005 | Wybenga et al. ............ 370/428 |
| 2006/0104286 | A1 | 5/2006 | Cheriton |
| 2006/0233173 | A1 | 10/2006 | Pullela et al. |
| 2009/0100219 | A1* | 4/2009 | Bhargava .................... 711/108 |

OTHER PUBLICATIONS

U.S. Appl. No. 11/122,612, filed May 5, 2005, Pullela et al.

"Extending the LANCAM Comparand," Application Brief AB N3, Rev. 1.0a Draft, Music Semiconductors, Milpitas, CA, Sep. 30, 1998, 4 pages.

"What is a CAM (Content-Addressable Memory)?," Application Brief AB N6, Rev. 2a, Music Semiconductors, Milpitas, CA, Sep. 30, 1998, 4 pages.

"Wide Ternary Searches Using Music CAMs and RCPs," Application Note AN N31, Rev. 0, Music Semiconductors, Milpitas, CA, Apr. 13, 1999, 8 pages.

* cited by examiner

COMBINED INTERFACE AND NON-INTERFACE SPECIFIC ASSOCIATIVE MEMORY LOOKUP OPERATIONS FOR PROCESSING OF PACKETS

TECHNICAL FIELD

One embodiment of the invention relates to communications and computer systems, especially computers, routers, packet switching systems, and other devices; and more particularly, one embodiment relates to combined interface and non-interface specific associative memory lookup operations for processing of packets.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

Packet classification as required for, inter alia, access control lists (ACLs), quality of service (QoS), policing, and forwarding decisions, is a demanding part of switch and router design. The packet classification of a received packet is increasingly becoming more difficult due to ever increasing packet rates and number of packet classifications. For example, ACLs require matching packets on a subset of fields of the packet flow label, with the semantics of a sequential search through the ACL rules; IP forwarding requires a longest prefix match.

Known approaches of packet classification include using custom application-specific integrated circuits (ASICs), custom circuitry, software or firmware controlled processors, binary and ternary content-addressable memories (CAMs). The use of programmable software or firmware have advantages as they provide some level of flexibility, which becomes especially important as new protocols and services are added to existing network. Customer typically desire to use their existing hardware (e.g., routers, switches, etc.) to support these new protocols and services. However, known software and firmware implementations are relatively slow, and typically place a performance bound which may be incompatible with new requirements. Various applications that use packet classification, such as Security Access Control, Quality of Service, etc., typically need to perform many matches on source and destination port numbers, protocol and/or other header fields, etc. in order to identify a corresponding netflow.

In a known prior system, one or more fields are extracted from a received packet. These one or more extracted fields typically include source and destination addresses, port numbers, and possibly other fields, typically included in the header or flow label of a packet. These extracted fields are provided in their native format, possibly along with other data, to a CAM, which performs a lookup operation in performing the packet classification. Because CAMs are expensive, especially in terms of space and power consumption and are limited in the width of an input lookup word, one known system preprocesses, via one or more logical functions or operations, certain information contained in a packet to generate a vector that is used as part of a lookup word. This vector reduces the number of bits that would be required if the entire native information was included in the lookup word. However, such known preprocessing only operates on the information contained in a received packet and not from any other source.

Programming an ACL can be a complex and/or redundant task. Typically, each network or possibly even host system requires a separate series of ACL entries. One known system reduces the overall numbers of ACLs by assigning virtual local area network (VLAN) identifiers to entities (e.g., networks, hosts, and router interfaces). A common ACL can then be shared by multiple entities by mapping their VLAN identifiers to a shared VLAN label, with this shared VLAN label being used to identify the common ACL or entries thereof.

However, in many situations, features used on different interfaces have the same classification criteria, but the interface dependent results for each class are handled differently on different interfaces. For example, they might have different security, QoS, or policing requirements, and the use of VLAN identifiers does not address this issue. Thus, currently, a feature is separately specified for each interface, with each of specifications translated into entries of the limited CAM resource. Although, one prior system does split ACLs for multiple interfaces into sharable and non-sharable entries. Two independent lookup operations are then performed on these sharable and non-sharable entries, with the matching ACL entry identified by selecting one of these two independent lookup results.

SUMMARY OF THE INVENTION

Disclosed are, inter alia, methods, apparatus, data structures, computer-readable media, and mechanisms, for policy-based processing of packets, including mechanisms for programming and performing combined interface and non-interface specific associative memory lookup operations for processing of packets, which may be of particular use when the number of different specifications of features is less than or far less than the number of different interfaces where such a feature is configured.

One embodiment includes multiple interfaces, a content-addressable memory, multiple memory entries and a lookup mechanism. These multiple interfaces include a first interface and a second interface. The content-addressable memory includes multiple content-addressable memory entries, which include multiple interface independent entries, multiple first interface dependent entries corresponding to the first interface, and multiple second interface dependent entries corresponding to the second interface. At least some of the memory entries correspond to the interface independent entries, and are configure to produce an interface independent result corresponding to a result of a lookup operation on the interface independent entries. The lookup mechanism is configured to initiate a lookup operation on the interface independent entries with a lookup word based on a packet corresponding to the first interface so as to produce the interface independent result, and configured to initiate a second lookup operation on the first interface entries with a second lookup word to generate a second result, the second lookup word including the interface independent result.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Systems and methods are disclosed for policy-based processing of packets, including mechanisms for programming and performing combined interface and non-interface specific associative memory lookup operations for processing of packets. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to, all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" is an extensible term, and refers to all types of known or future developed associative memories, including, but not limited to binary and ternary content addressable memories, hash tables, TRIE and other data structures, etc. Additionally, the term "associative memory unit" may include, but is not limited to one or more associative memory devices or parts thereof, including, but not limited to regions, segments, banks, pages, blocks, sets of entries, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium or media containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular form of a noun is non-limiting, with its use typically including one or more of the particular thing rather than just one (e.g., the use of the word "memory" typically refers to one or more memories without having to specify "memory or memories," or "one or more memories" or "at least one memory," etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, data structures, computer-readable media, and mechanisms, for policy-based processing of packets, including mechanisms for programming and performing combined interface and non-interface specific associative memory lookup operations for processing of packets. One embodiment includes multiple interfaces, a content-addressable memory, multiple memory entries and a lookup mechanism. These multiple interfaces include a first interface and a second interface. The content-addressable memory includes multiple content-addressable memory entries, which include multiple interface independent entries, multiple first interface dependent entries corresponding to the first interface, and multiple second interface dependent entries corresponding to the second interface. At least some of the memory entries correspond to the interface independent entries, and are configure to produce an interface independent result corresponding to a result of a lookup operation on the interface independent entries. The lookup mechanism is configured to initiate a lookup operation on the interface independent entries with a lookup word based on a first packet corresponding to the first interface so as to produce the interface independent result, and configured to initiate a second lookup operation on the first interface entries with a second lookup word to generate a second result, the second lookup word including the interface independent result.

In one embodiment, the second lookup word further includes one or more fields based on the first packet or first interface. In one embodiment, the interface independent entries correspond to different classes of service. In one embodiment, the first interface entries correspond to specific class limitations for the first interface for different classes of service. In one embodiment, the lookup mechanism is also configured to initiate a third lookup operation on the interface independent entries with a third lookup word based on a second packet corresponding to the second interface so as to produce the interface independent result, and configured to initiate a fourth lookup operation on the second interface entries with a fourth lookup word to generate a fourth result, the fourth lookup word including the interface independent result. In one embodiment, the fourth lookup word further includes one or more fields based on the second packet or the second interface. In one embodiment, the interface independent entries correspond to different classes of service. In one embodiment, the first interface entries correspond to specific class limitations for the first interface for different classes of service, and the second interface entries correspond to specific class limitations for the second interface for the different classes of service.

One embodiment programs a content-addressable memory for use with multiple interfaces, with the content-addressable memory including multiple interface independent entries and multiple interface dependent entries for each interface. For each particular feature definition corresponding to a particular interface of a plurality of different interfaces: the particular feature definition is separated into an interface independent portion and an interface dependent portion; at least one interface independent entry is programmed based on the interface independent portion (if these interface independent entries have not already been so programmed); and at least one of the interface dependent entries corresponding to the particular interface is programmed based on the interface dependent portion.

In one embodiment, interface independent entries correspond to different classes of service. In one embodiment, the interface dependent entries corresponding to the particular interface correspond to specific class limitations for the particular interface for said different classes of service.

Figure 1A:
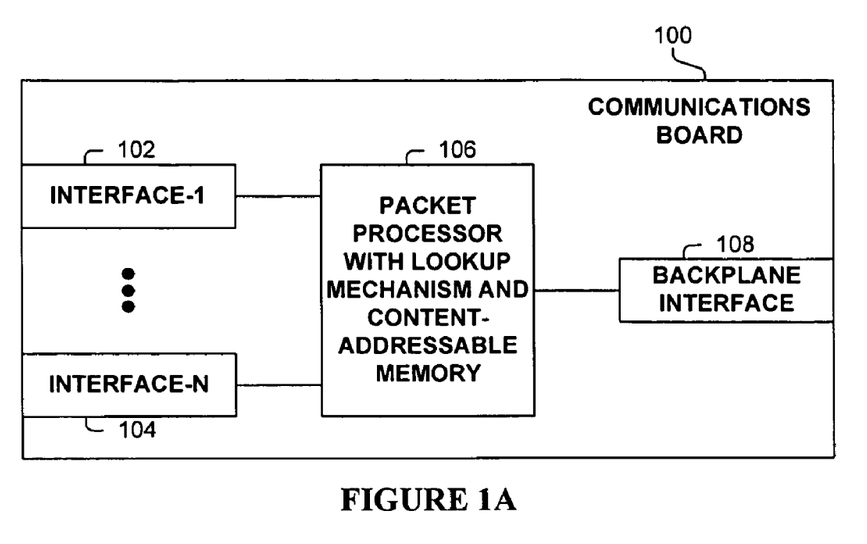
FIG. 1A is a block diagram illustrating a communications board of one embodiment.

Turning to the figures, FIG. 1A illustrates a communications board 100 which includes multiple interfaces 102-104 for receiving and/or sending packets, a packet processor 106 with lookup mechanism and content-addressable memory, and a backplane interface 108 for communicating with other elements of the computer or communications system.

Figure 1B:
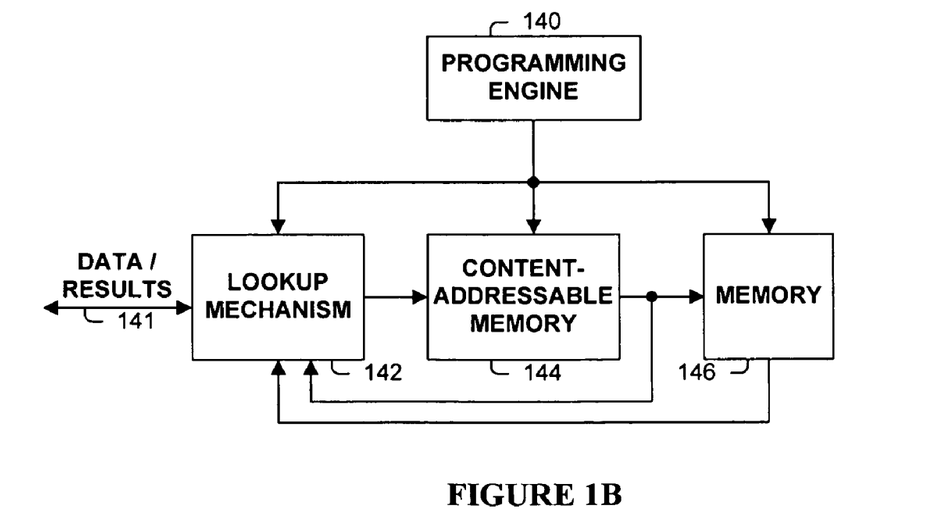
FIG. 1B is a block diagram illustrating a system of one embodiment.

FIG. 1B illustrates a lookup mechanism 142 (e.g., one or more general or custom hardware and/or software devices), a content-addressable memory 144, a memory 146, and a programming engine 140 configured in one embodiment to program at least the content-addressable memory 144 and memory 146 with the interface independent and dependent portions of the desired features.

For example, in one embodiment, lookup mechanism 141 receives a packet (e.g., the packet or portion of the packet, or an indication thereof), and initiates a lookup operation on the interface independent entries in content-addressable memory 144 based on the corresponding particular interface on which the packet was received or from where it is to be sent. This interface independent content-addressable memory lookup result is then used to perform a lookup operation in memory 146 to return an interface independent lookup result (e.g., a class of service indication). Note, in one embodiment the memory entries of memory 146 are included content-addressable memory 144. Lookup mechanism 142 then initiates another lookup operation in content-addressable memory 144 (based on a lookup word including interface independent lookup result) on the interface dependent entries corresponding to the particular interface to produce an interface dependent content-addressable memory result which can be used directly for processing the packet or used to perform a lookup operation in memory 146 to generate the result for use in processing the packet.

Thus, for example, the interface independent lookup portion will identify a class of service for the packet received on the particular interface, and the interface dependent lookup portion will identify a specific class of service limitation such as, but not limited to, a policing or bandwidth specified limitation.

Figure 1C:
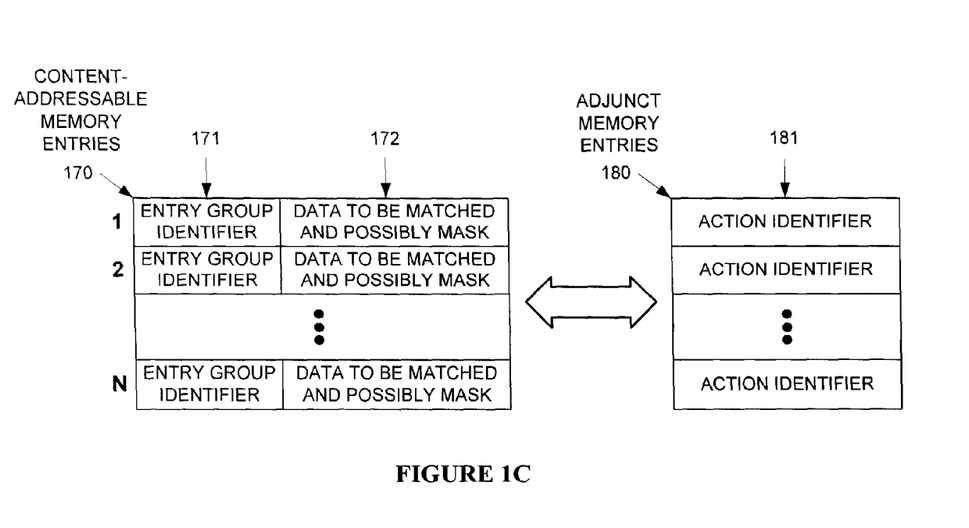
FIG. 1C is a block diagram illustrating content-addressable memory entries and adjunct memory entries of one embodiment.

FIG. 1C is a block diagram illustrating content-addressable memory entries 170 and adjunct memory entries 180 used in one embodiment. As shown, each group of associative memory entries can be identified by an entry group identifier 171 (e.g., a different value for the interface independent entries and for each of the particular interface dependent entries). Each entry also includes a field 172 for storing the data value to be matched and possibly a mask (e.g., for a ternary content-addressable memory). The entries of adjunct memory 180 typically include an action identifier 181, such as a value corresponding to a class of service for interface independent entries and to one or more specific service limitations for the interface dependent entries of content-addressable memory entries 170.

Figure 2:
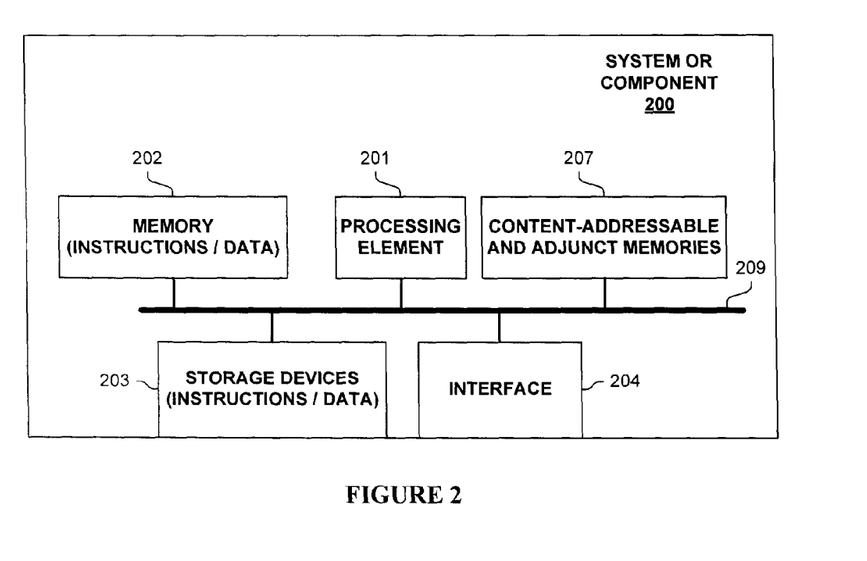
FIG. 2 is a block diagram illustrating a system or component of one embodiment.

FIG. 2 is a block diagram illustrating a system or component 200 (e.g., a programming engine or lookup mechanism, or portion thereof, etc.) of one embodiment. In one embodiment, system 200 includes a processor 201, memory 202, storage devices 203, and interface 204 for receiving and transmitting packets or other processed information, and possibly a content-addressable memory and adjunct memory 207 (e.g., content-addressable and adjunct memories for performing interface independent and interface dependent lookup operations), which are coupled via one or more communications mechanisms 209 (shown as a bus for illustrative purposes). Note, in one embodiment, the content-addressable memory and optional adjunct memory are external to system 200.

Various embodiments of system 200 may include more or less elements. The operation of system 200 is typically controlled by processor 201 using memory 202 and storage devices 203 to perform one or more tasks or processes, such as programming associative memories and optional adjunct memories 207.

Memory 202 is one type of computer-readable medium, and typically comprises random access memory (RAM), read only memory (ROM), flash memory, integrated circuits, and/or other memory components. Memory 202 typically stores computer-executable instructions to be executed by processor 201 and/or data which is manipulated by processor 201 for implementing functionality in accordance with one embodiment of the invention. Storage devices 203 are another type of computer-readable medium, and typically comprise solid state storage media, disk drives, diskettes, networked services, tape drives, and other storage devices. Storage devices 203 typically store computer-executable instructions to be executed by processor 201 and/or data which is manipulated by processor 201 for implementing functionality in accordance with one embodiment of the invention.

Figure 3A:
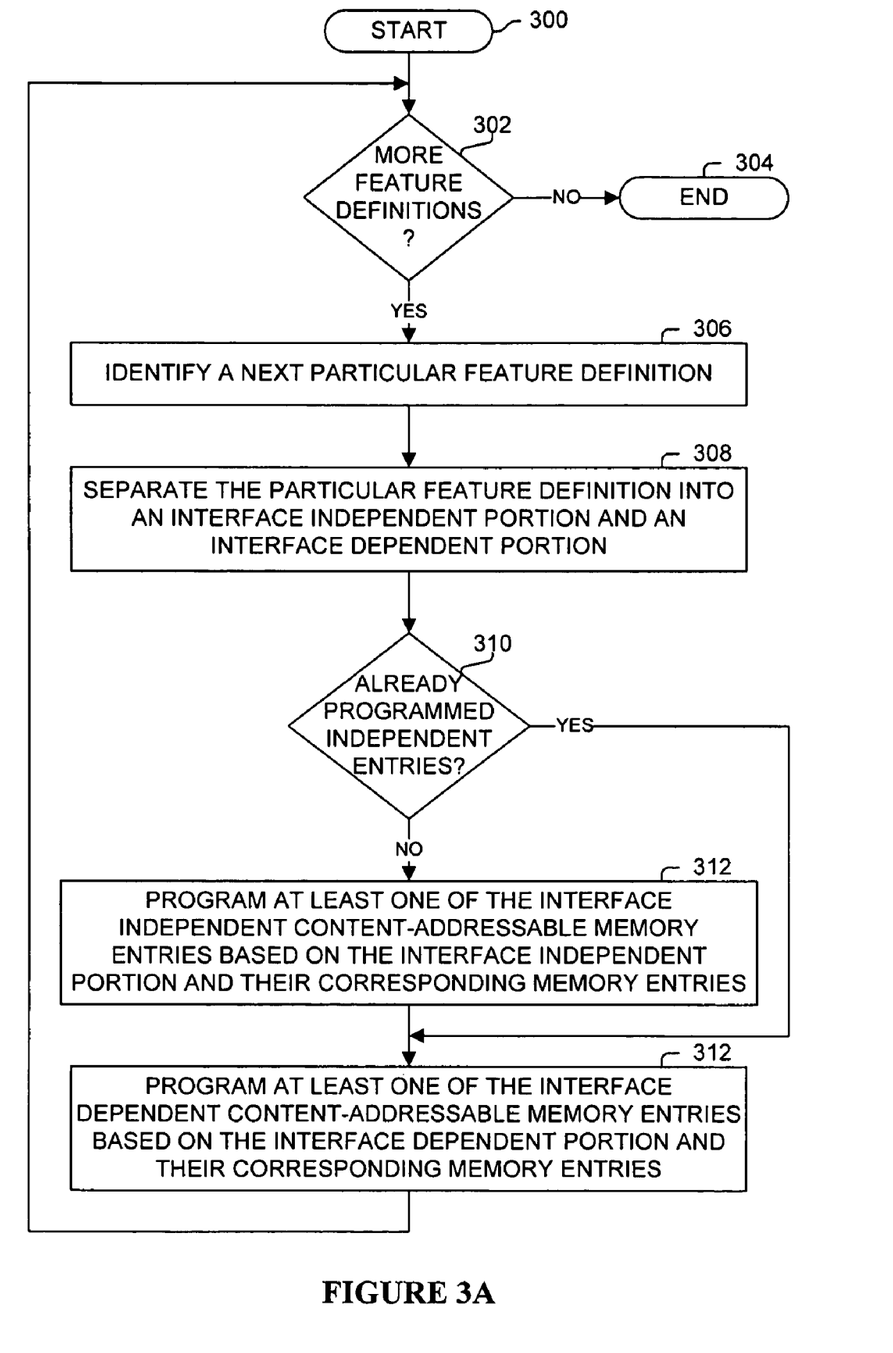
FIG. 3A is a flow diagram illustrating the programming of content-addressable memory entries and adjunct memory entries as performed in one embodiment.

FIG. 3A is a flow diagram illustrating the programming of content-addressable memory entries and adjunct memory entries as performed in one embodiment. Processing begins with process block 300. As determined in process block 302, while there are more features definitions to program, processing repeats process blocks 306-312. In process block 306, a next particular feature definition is identified. In process block 308, the particular feature definition is separated into an interface independent portion and an interface dependent portion. As determined in process block 310, if the interface independent portion has not already been programmed into the interface independent content-addressable memory entries, then in process block 312, one or more interface independent content-addressable entries and their corresponding adjunct memory entries are programmed based on the interface independent portion. In process block 314, one or more interface dependent content-addressable entries and their corresponding adjunct memory entries (if any) are programmed based on the interface dependent portion. Processing returns to process block 302. When all feature definitions have been processed as determined in process block 302, processing is complete as indicated by process block 304.

Figure 3B:
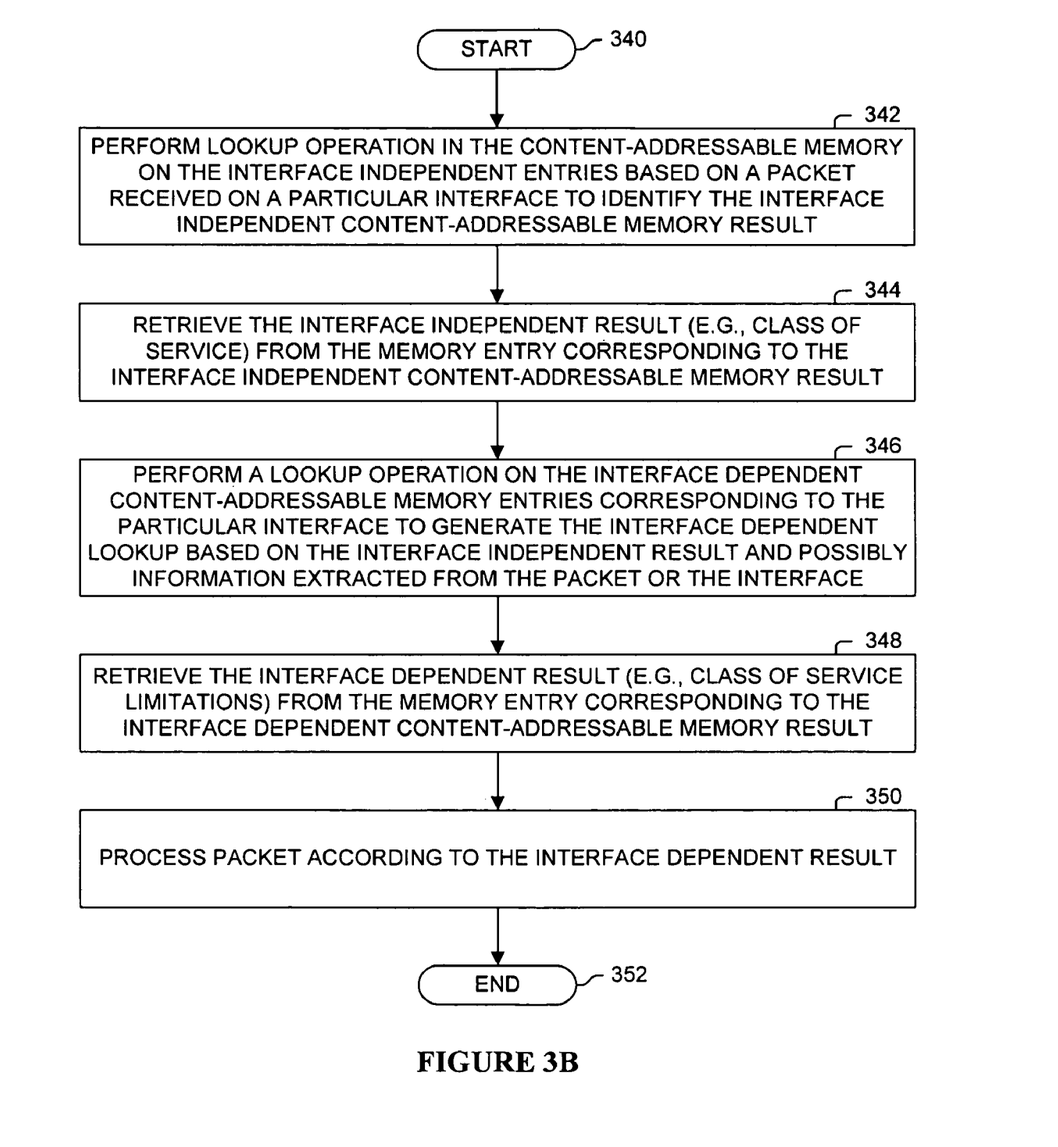
FIG. 3B is a flow diagram illustrating the performing of lookup operations on the interface independent and dependent content-addressable memory entries as performed in one embodiment.

FIG. 3B is a flow diagram illustrating the performing of lookup operations on the interface independent and dependent content-addressable memory entries as performed in one embodiment. Processing begins with process block 340. In process block 342, a lookup operation is performed on the interface independent content-addressable memory entries based on a packet received on a particular interface to identify the interface independent content-addressable memory result. In process block 344, the interface independent result (e.g., class of service) is retrieved from the memory entry corresponding to the interface independent content-addressable memory result. In process block 346, a lookup operation is performed on the interface dependent content-addressable memory entries corresponding to the particular interface to generate the interface dependent lookup based on the interface independent result and possibly information extracted from the packet and/or the interface. In process block 348, the interface dependent result (e.g., class of service limitations) is retrieved from the memory entry corresponding to the interface dependent content-addressable memory result. In process block 350, the packet is processed according to the interface dependent result. Processing is complete as indicated by process block 352.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus, comprising:
   a plurality of interfaces including a first interface and a second interface;
   a content-addressable memory including a plurality of content-addressable memory entries, said content-addressable memory entries including: a plurality of interface independent entries; a plurality of first interface dependent entries corresponding to the first interface; and a plurality of second interface dependent entries corresponding to the second interface;
   a plurality of memory entries corresponding to the plurality of interface independent entries, the plurality of memory entries configured to produce an interface independent result corresponding to a result of a lookup operation on the plurality of interface independent entries; and
   a lookup mechanism configured to initiate a lookup operation on said interface independent entries with a lookup word based on a first packet corresponding to the first interface so as to produce the interface independent result, and configured to initiate a second lookup operation on said first interface dependent entries with a second lookup word to generate a second result, the second lookup word including the interface independent result.

2. The apparatus of claim 1, wherein the second lookup word further includes one or more fields based on the first packet or the first interface.

3. The apparatus of claim 1, wherein said interface independent entries correspond to different classes of service.

4. The apparatus of claim 3, wherein said first interface dependent entries correspond to specific class limitations for the first interface for said different classes of service.

5. The apparatus of claim 1, wherein the lookup mechanism is also configured to initiate a third lookup operation on said interface independent entries with a third lookup word based on a second packet corresponding to the second interface so as to produce the interface independent result, and configured to initiate a fourth lookup operation on said second interface dependent entries with a fourth lookup word to generate a fourth result, the fourth lookup word including the interface independent result.

6. The apparatus of claim 5, wherein the fourth lookup word further includes one or more fields based on the second packet or the second interface.

7. The apparatus of claim 5, wherein said interface independent entries correspond to different classes of service.

8. The apparatus of claim 7, wherein said first interface dependent entries correspond to specific class limitations for the first interface for said different classes of service, and said second interface dependent entries correspond to specific class limitations for the second interface for said different classes of service.

9. A method performed in a particular machine, comprising:
   wherein the particular machine includes:
      a plurality of interfaces including a first interface and a second interface;
      a content-addressable memory including a plurality of content-addressable memory entries, said content-addressable memory entries including: a plurality of interface independent entries; a plurality of first interface dependent entries corresponding to the first interface; and a plurality of second interface dependent entries corresponding to the second interface;
      a plurality of memory entries corresponding to the plurality of interface independent entries, the plurality of memory entries configured to produce an interface independent result corresponding to a result of a lookup operation on the plurality of interface independent entries; and
      a lookup mechanism; and
   wherein the method comprises:
      performing a lookup operation on said interface independent entries with a lookup word based on a first packet corresponding to the first interface so as to produce the interface independent result, and
      performing a second lookup operation on said first interface dependent entries with a second lookup word to generate a second result; wherein the second lookup word includes the interface independent result.

10. The method of claim 9, wherein the second lookup word further includes one or more fields based on the first packet or the first interface.

11. The method of claim 9, wherein said interface independent entries correspond to different classes of service.

12. The method of claim 11, wherein said first interface dependent entries correspond to specific class limitations for the first interface for said different classes of service.

13. The method of claim 9, wherein the method includes:
   performing a third lookup operation on said interface independent entries with a third lookup word based on a second packet corresponding to the second interface so as to produce the interface independent result; and
   performing a fourth lookup operation on said second interface dependent entries with a fourth lookup word to generate a fourth result; wherein the fourth lookup word includes the interface independent result.

14. The method of claim 13, wherein the fourth lookup word further includes one or more fields based on the second packet or the second interface.

15. The method of claim 13, wherein said interface independent entries correspond to different classes of service.

16. The method of claim 15, wherein said first interface dependent entries correspond to specific class limitations for the first interface for said different classes of service, and said second interface dependent entries correspond to specific class limitations for the second interface for said different classes of service.

* * * * *